US012798942B2

(12) United States Patent
Inoue et al.

(10) Patent No.: US 12,798,942 B2
(45) Date of Patent: Nov. 17, 2026

(54) DRIVE UNIT

(71) Applicant: EXEDY Corporation, Neyagawa (JP)

(72) Inventors: Shin Inoue, Neyagawa (JP); Hitoshi Katsura, Neyagawa (JP)

(73) Assignee: EXEDY CORPORATION, Neyagawa (JP)

(*) Notice: Subject to any disclaimer, the term of this patent is extended or adjusted under 35 U.S.C. 154(b) by 308 days.

(21) Appl. No.: 18/596,423

(22) Filed: Mar. 5, 2024

(65) Prior Publication Data

US 2024/0317556 A1 Sep. 26, 2024

(30) Foreign Application Priority Data

Mar. 23, 2023 (JP) ................................ 2023-046706

(51) Int. Cl.

*B62B 5/00* (2006.01)
*B62B 3/00* (2006.01)
*B62B 3/06* (2006.01)
*B66F 9/065* (2006.01)
*B66F 9/075* (2006.01)
*B66F 17/00* (2006.01)

(52) U.S. Cl.

CPC ........ *B66F 9/07572* (2013.01); *B62B 3/0612* (2013.01); *B62B 5/0033* (2013.01); *B62B 5/0069* (2013.01); *B66F 9/065* (2013.01); *B66F 17/00* (2013.01); *B62B 2202/90* (2013.01)

(58) Field of Classification Search

CPC . B62B 3/0612; B62B 5/0033; B62B 2301/23; B62B 5/0053; B62B 5/0059; B62B 5/0069; B62B 3/06; B62B 5/0046; B62B 2202/90; B66F 9/07572; B66F 17/00; B66F 9/065; B66F 17/003; B66F 9/0759

See application file for complete search history.

(56) References Cited

U.S. PATENT DOCUMENTS 9,913,771 B2 * 3/2018 March .................. B62B 5/0079
12,479,490 B2 * 11/2025 Shibata ................. B62D 51/04

(Continued)

FOREIGN PATENT DOCUMENTS

JP 2014512307 A 5/2014

OTHER PUBLICATIONS

Makita Battery Powered Wheelbarrow Manual (Year: 2022).*

(Continued)

*Primary Examiner* — Mahdi H Nejad

(74) *Attorney, Agent, or Firm* — United IP Counselors, LLC

(57) ABSTRACT

The disclosed drive unit is configured to help prevent a user from being sandwiched between a mobile object and an object of some kind when the user tows the mobile object. The drive unit includes an electric motor, an operating part, and a control part. The operating part is configured to be operated in a towing direction and a pushing direction. The operating part is located on the distal end in the towing direction. When determining that the operating part has been operated in the towing direction, the control part is configured to control the electric motor such that a mobile object travels in the towing direction. Conversely, when determining that the operating part has been operated in the pushing direction, the control part is configured to control the electric motor such that the mobile object travels in the pushing direction.

5 Claims, 5 Drawing Sheets

(56) References Cited

U.S. PATENT DOCUMENTS

| | | | | |
|---|---|---|---|---|
| 2004/0213656 | A1* | 10/2004 | Lear | B66F 5/04 414/495 |
| 2006/0232030 | A1* | 10/2006 | Passeri | B62B 3/0612 280/43.12 |
| 2012/0269606 | A1 | 10/2012 | Newell | |
| 2019/0269566 | A1* | 9/2019 | Katsura | A61G 5/04 |
| 2021/0213993 | A1* | 7/2021 | Katsura | B62B 3/06 |
| 2023/0068277 | A1* | 3/2023 | Ohashi | B62B 5/0447 |
| 2023/0174130 | A1* | 6/2023 | Shibata | B62B 5/06 |
| 2024/0278819 | A1* | 8/2024 | Kalinowski | B62B 3/04 |
| 2024/0317556 | A1* | 9/2024 | Inoue | B66F 17/00 |

OTHER PUBLICATIONS

Makita DCU602Z 36V LXT Cordless Wheelbarrow found at: https://www.youtube.com/watch?v=qRel3Tt6tzk (Year: 2024).*

Makita Battery Powered Wheelbarrow DCU601 (Electric Lift) found at: https://www.facebook.com/MakitaSG/videos/makita-battery-powered-wheelbarrow-dcu601-electric-lift/259090408253554946/ (Year: 2025).*

18V X2 LXT® Lithium-Ion Brushless Cordless Power-Assisted Wheelbarrow found at: https://www.youtube.com/watch?v=sXYjhdU_gqQ (Year: 2020).*

* cited by examiner

DRIVE UNIT

CROSS-REFERENCE TO RELATED APPLICATIONS

This application is based on and claims the priority benefit of Japanese application 2023-046706 filed on Mar. 23, 2023, the contents of which are incorporated herein by reference.

TECHNICAL FIELD

The claimed invention relates to a drive unit.

BACKGROUND

To enhance the performance of a mobile object such as a pallet truck, there has been disclosed a pallet truck of an electric type with an embedded electric motor. For example, a pallet truck, disclosed in Japanese translation of PCT International Application Publication No. 2014-512307, is of an electric type formed by embedding a drive unit in a pallet truck of a manual type.

There is a concern that when towing such a pallet truck of an electric type as described above, a user might be sandwiched between the pallet truck and an object of some kind such as a wall.

SUMMARY OF THE INVENTION

In view of this concern, it is an object of the claimed invention to prevent the user from being sandwiched between the mobile object and the object of some kind when the user tows the mobile object. A drive unit according to a first aspect is configured to make a mobile object travel in a towing direction in which the mobile object is towed and a pushing direction in which the mobile object is pushed. The drive unit includes an electric motor, an operating part, and a control part. The operating part is configured to be operated in the towing direction and the pushing direction. The operating part is located on a distal end in the towing direction. The control part is configured to control the electric motor such that the mobile object travels in the towing direction when it is determined that the operating part has been operated in the towing direction. Additionally, the control part is configured to control the electric motor such that the mobile object travels in the pushing direction when it is determined that the operating part has been operated in the pushing direction.

According to the configuration, when unintentionally contacted by the mobile object in towing of the mobile object, a user is first contacted by the operating part. Then, when the mobile object travels in the towing direction as it is, the operating part in contact with the user is operated in the pushing direction; hence, the control part controls the electric motor such that the mobile object travels in the pushing direction. As a result, the mobile object travels in the pushing direction to move away from the user, whereby it is made possible to prevent the user from being sandwiched between the mobile object and an object of some kind. Additionally, in the drive unit described above, the operating part is not only used in operation of traveling of the mobile object but also has a function of preventing a user-sandwiched state; hence, it is not required to separately construct a system for preventing the user-sandwiched state, whereby system simplification can be intended.

A drive unit according to a second aspect relates to the drive unit according to the first aspect and further includes a support part, an operating mast, and a handle part. The operating mast extends upward from the support part. The handle part is disposed on an upper end of the operating mast. The operating part is attached to the handle part.

A drive unit according to a third aspect relates to the drive unit according to the second aspect and further includes an emergency stop switch. The emergency stop switch is disposed on the handle part. The control part is configured to stop the electric motor when the emergency stop switch has been operated by a user.

A drive unit according to a fourth aspect relates to the drive unit according to the second or third aspect and is configured as follows. The operating part includes an operating lever. The operating lever extends from the handle part and is located on the distal end in the towing direction.

A drive unit according to a fifth aspect relates to the drive unit according to any of the second to fourth aspects and is configured as follows. The operating part includes a base portion, an operating lever, and a contact portion. The base portion is attached to the handle part. The operating lever extends from the base portion. The operating lever is configured to be unitarily operated with the base portion. The contact portion is configured to be unitarily operated with the base portion. The contact portion is located on the distal end in the towing direction.

A pallet truck according to a sixth aspect includes a loading platform and the drive unit recited in any of the second to fifth aspects. The support portion is attached to the loading platform.

Overall, according to the claimed invention, it is made possible to prevent a user from being sandwiched between a mobile object and an object of some kind when the user tows the mobile object.

DETAILED DESCRIPTION

Figure 1:
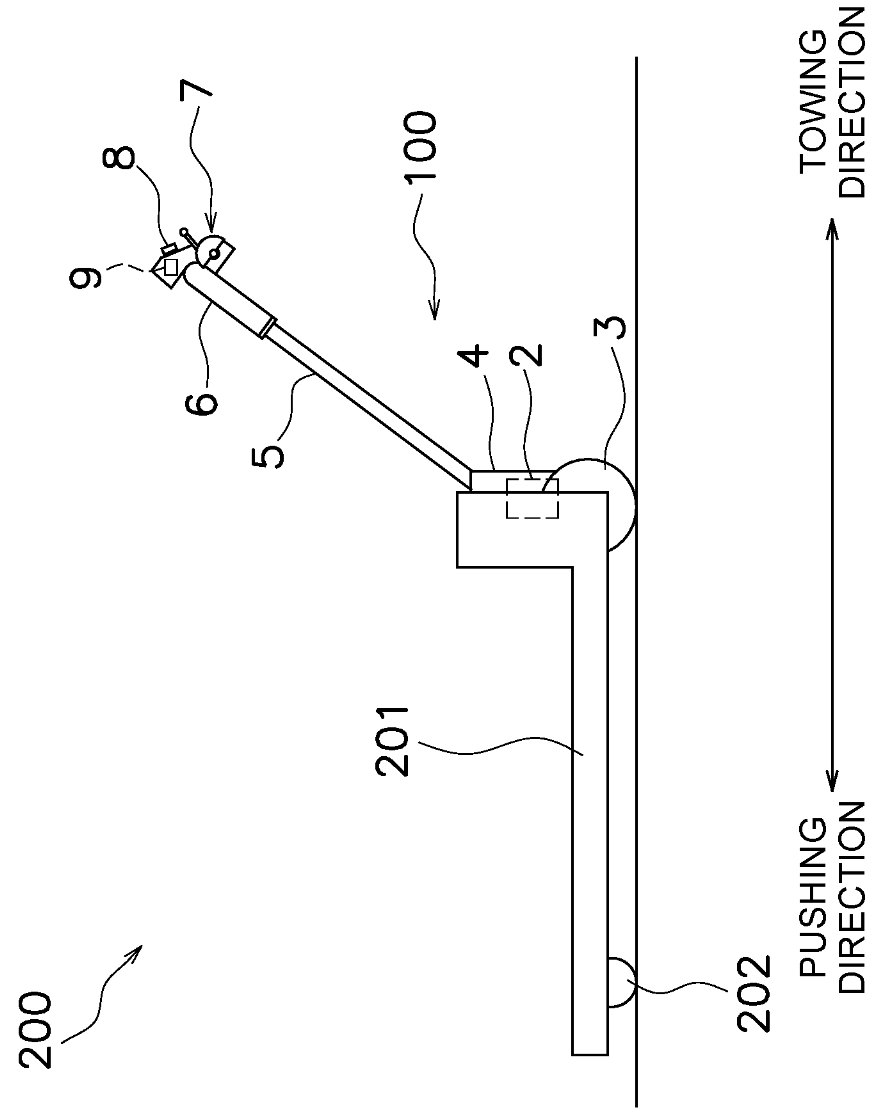
FIG. 1 is a side view of a pallet truck.

A pallet truck (an exemplary mobile object) embedded with a drive unit according to the presently preferred embodiment will be hereinafter explained with reference to the drawings. It should be noted that FIG. 1 is a side view of the pallet truck embedded with the drive unit according to the presently preferred embodiment. It should be noted that the drive unit can be also embedded in a mobile object other than the pallet truck, e.g., a hand lift truck, a hand truck, or a wheelchair or so forth.

As shown in FIG. 1, a pallet truck 200 includes a loading platform (a pair of fork arms) 201, a plurality of vehicle wheels 202, and a drive unit 100. Each vehicle wheel 202 is attached to the loading platform 201. Each vehicle wheel 202 is a non-drive wheel.

The drive unit 100 is attached to the loading platform 201. The drive unit 100 is configured to make the pallet truck 200 travel in a towing direction and a pushing direction. It should be noted that the term “towing direction” refers to a direction in which the pallet truck 200 is towed by a user. In the presently preferred embodiment, the right direction in FIG. 1 corresponds to the towing direction. On the other hand, the term “pushing direction” refers to a direction in which the pallet truck 200 is pushed by the user. In the presently preferred embodiment, the left direction in FIG. 1 corresponds to the pushing direction. The pushing direction is defined as the opposite direction to the towing direction.

The drive unit 100 includes a battery (not shown), an electric motor 2, and a drive wheel 3. Besides, the drive unit 100 includes a support part 4, an operating mast 5, a handle part 6, an operating part 7, an emergency stop switch 8, and a control part 9.

The battery is configured to supply electric power to the electric motor 2 and so forth. The electric motor 2 is configured to be driven by the electric power supplied thereto from the battery. The battery is detachably attached to, for instance, the support part 4. The electric motor 2 rotates and drives the drive wheel 3. The pallet truck 200 is enabled to travel by only a drive force generated by the electric motor 2. It should be noted that the pallet truck 200 may be configured to travel by a human drive force generated by the user and an assist force generated by the electric motor 2.

The support part 4 is attached to the loading platform 201. The support part 4 supports the battery, the electric motor 2, the drive wheel 3, and so forth. The operating mast 5 extends upward from the support part 4. The operating mast 5 is configured to be pivotable about the lower end thereof. It should be noted that when pivoted, the operating mast 5 is tilted to lean in the towing direction.

The handle part 6 is disposed on the upper end of the operating mast 5. For example, the handle part 6 extends from the upper end of the operating mast 5 in the width direction (perpendicular to the drawing of FIG. 1) of the pallet truck 200. The handle part 6 may be made in shape of an annulus, or alternatively, may be made in shape of a rod. While holding the handle part 6, the user makes the pallet truck 200 travel in the towing direction and the pushing direction.

Figure 2:
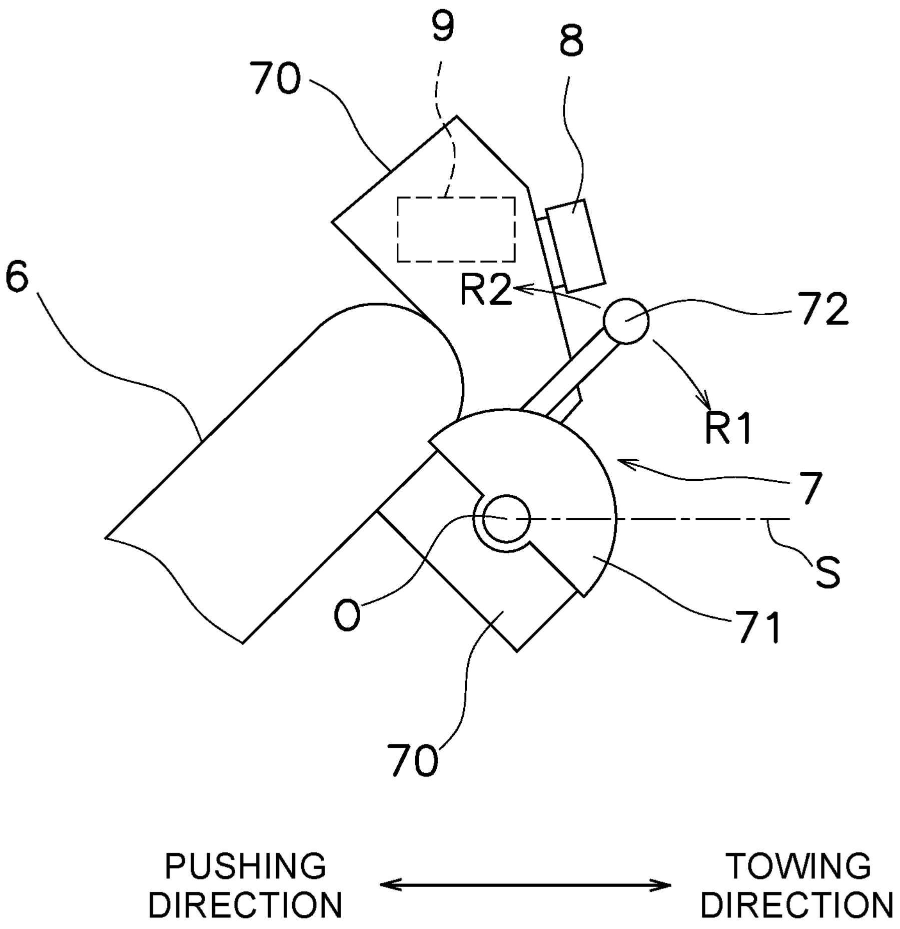
FIG. 2 is a closeup view of an operating part and the surroundings thereof.

FIG. 2 is a detailed closeup view of the operating part 7 and the surroundings thereof. It should be noted that the operating part 7 shown in FIG. 2 is set in a neutral position. As shown in FIG. 2, the operating part 7 is attached to the handle part 6. The operating part 7 is pivotably attached to the handle part 6. More specifically, the operating part 7 is attached to the handle part 6 through an attachment part 70. The attachment part 70 is fixed to the handle part 6. The operating part 7 is pivotably attached to the attachment part 70.

The operating part 7 is configured to be operated by the user in the towing direction and the pushing direction. It should be noted that in the presently preferred embodiment, the state “the operating part 7 is operated in the towing direction” means that the operating part 7 is operated to be pivoted about a pivot axis O in the towing direction. When pivoted in the towing direction, the operating part 7 is rotated clockwise (R1 in FIG. 2) about the pivot axis O.

On the other hand, in the presently preferred embodiment, the state “the operating part 7 is operated in the pushing direction” means that the operating part 7 is operated to be pivoted about the pivot axis O in the pushing direction. When pivoted in the pushing direction, the operating part 7 is rotated counterclockwise (R2 in FIG. 2) about the pivot axis O.

The operating part 7 is located on the distal end in the towing direction. Specifically, in towing traveling of the pallet truck 200, the operating part 7 is located on the distal end in the towing direction, while the operating mast 5 is tilted in the towing direction. It should be noted that preferably, the operating part 7 is also located on the distal end in the towing direction, while the operating mast 5 is not being tilted.

The operating part 7 is thus located on the distal end in the towing direction; hence, during traveling of the pallet truck 200 in the towing direction, amongst the constituent parts of the pallet truck 200, the operating part 7 is firstly contacted to the user. Amongst portions of the operating part 7, the portion located on the distal end in the towing direction (i.e., the distal end portion) is preferably disposed not to be located within an imaginary plane S extended from the pivot axis O in the towing direction. Besides, the distal end portion of the operating part 7 is set not to pivot across the imaginary plane S extended from the pivot axis O in the towing direction.

When not being operated at all, the operating part 7 is set in the neutral position. When released from the hand of the user, the operating part 7 returns to the neutral position. In other words, the operating part 7 is of a momentary type. When set in the neutral position, the operating part 7 is located on the distal end in the towing direction.

The operating part 7 includes a base portion 71 and an operating lever 72. The base portion 71 is attached to the handle part 6. More particularly, the base portion 71 is attached to the handle part 6 through the attachment part 70. The base portion 71 is pivotable about the pivot axis O.

The operating lever 72 extends from the base portion 71. The operating lever 72 is configured to be unitarily operated with the base portion 71. In other words, the operating lever 72 is unitarily pivoted with the base portion 71. The operating lever 72 is fixed to the base portion 71. The operating lever 72 is located on the distal end in the towing direction.

The emergency stop switch 8 is attached onto the handle part 6. More particularly, the emergency stop switch 8 is attached onto the handle part 6 through the attachment part 70. For example, the emergency stop switch 8 may be a button switch. When the emergency stop switch 8 is operated (e.g., pushed) by the user, the electric motor 2 is stopped. Because of this, when the emergency switch 8 is operated during towing traveling of the pallet truck 200, the pallet truck 200 stops traveling.

The control part 9 is configured to control the electric motor 2 in accordance with the operating part 7 operated by the user. Specifically, when it is determined that the operating part 7 has been operated in the towing direction, the control part 9 is configured to control the electric motor 2 such that the pallet truck 200 travels in the towing direction. On the other hand, when it is determined that the operating part 7 has been operated in the pushing direction, the control part 9 is configured to control the electric motor 2 such that the pallet truck 200 travels in the pushing direction. It should be noted further that when it is determined that the operating part 7 has not been operated, i.e., the operating part 7 is in the neutral position, the control part 9 is configured to stop the electric motor 2.

For example, a computer (e.g., microcomputer), including a CPU (Central Processing Unit), a ROM (Read Only Memory), and so forth, is provided as the control part 9. The ROM stores programs for various computations. The CPU executes the programs stored in the ROM.

Next, the action of the pallet truck 200 configured as described above will be explained with reference to FIG. 3.

Figure 3:
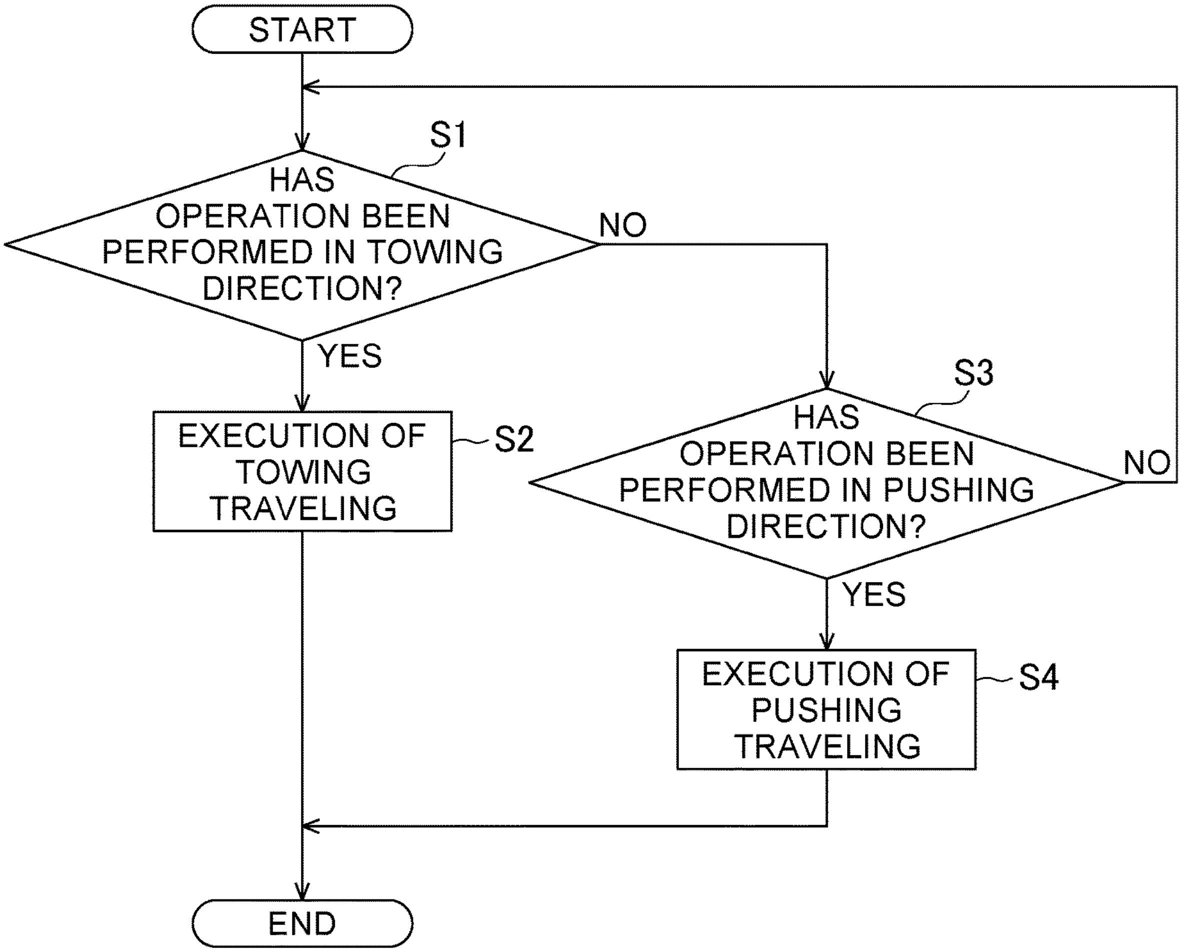
FIG. 3 is a flowchart exemplifying a series of processing executed by a control part.

It should be noted that FIG. 3 is a flowchart exemplifying a series of processing steps executed by the control part 9. As shown in FIG. 3, the control part 9 determines whether or not the operating part 7 has been operated in the towing direction (step S1). For example, when intending to make the pallet truck 200 travel in the towing direction, the user operates the operating lever 72 from the neutral position in the towing direction; namely, the user rotates the operating lever 72 clockwise (R1 in FIG. 2). When the operating lever 72 is thus moved, the control part 9 determines that the operating part 7 has been operated in the towing direction.

When it has been determined that the operating part 7 has been operated in the towing direction (YES in step S1), the control part 9 controls the electric motor 2 such that the pallet truck 200 travels in the towing direction (step S2). In other words, the control part 9 makes the pallet truck 200 perform towing traveling.

When determining that the operating part 7 has not been operated in the towing direction (NO in step S1), the control part 9 next determines whether or not the operating part 7 has been operated in the pushing direction (step S3). When it is determined that the operating part 7 has not been operated in the pushing direction (NO in step S3), the control part 9 executes again the processing from the step S1. On the other hand, when it is determined that the operating part 7 has been operated in the pushing direction (YES in step S3), the control part 9 controls the electric motor 2 such that the pallet truck 200 travels in the pushing direction (step S4). In other words, the control part 9 makes the pallet truck 200 perform pushing traveling.

Figure 4:
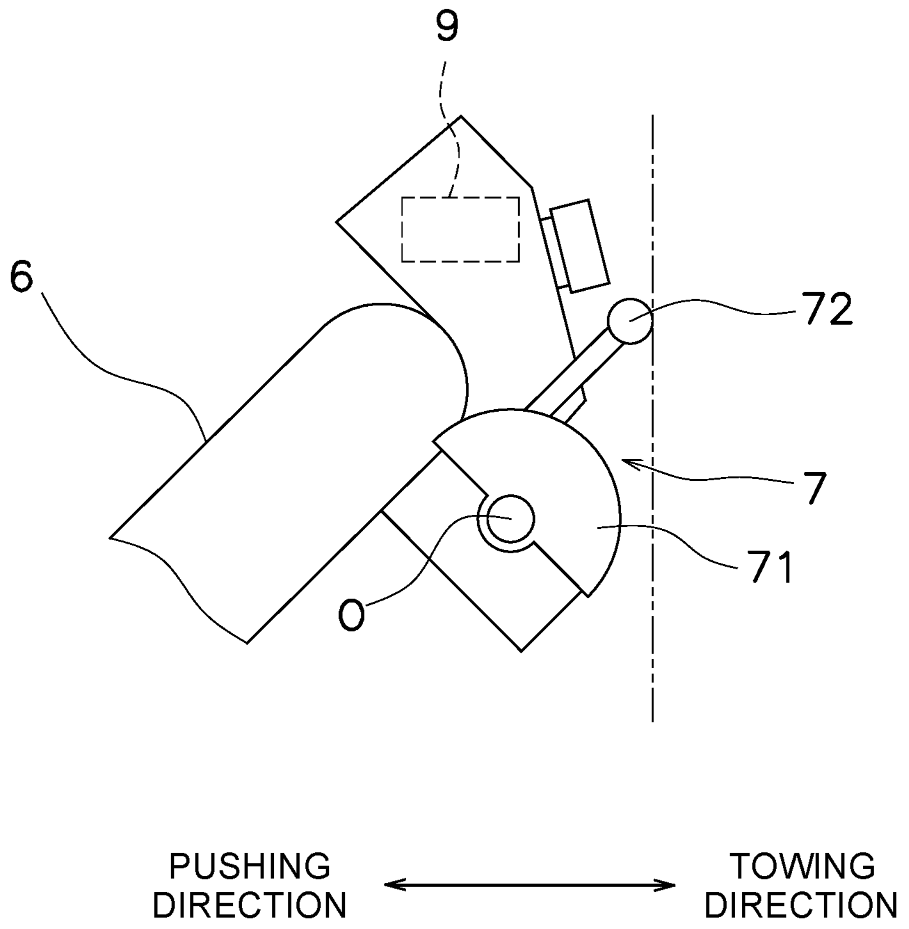
FIG. 4 is a closeup view showing an action of an operating part.

According to the drive unit 100 configured as described above, it is possible to prevent the user from being sandwiched between the pallet truck 200 and an object of some kind as follows. First, when the operating part 7 is operated by the user in the towing direction, the control part 9 controls the electric motor 2, whereby the pallet truck 200 travels in the towing direction. As shown in FIG. 4, when the pallet truck 200 contacts the user (dashed two-dotted line in FIG. 4), the operating part 7 in particular contacts the user because the operating part 7 is located on the distal end in the towing direction. Specifically, the operating lever 72 of the operating part 7 makes contact with the user.

Figure 5:
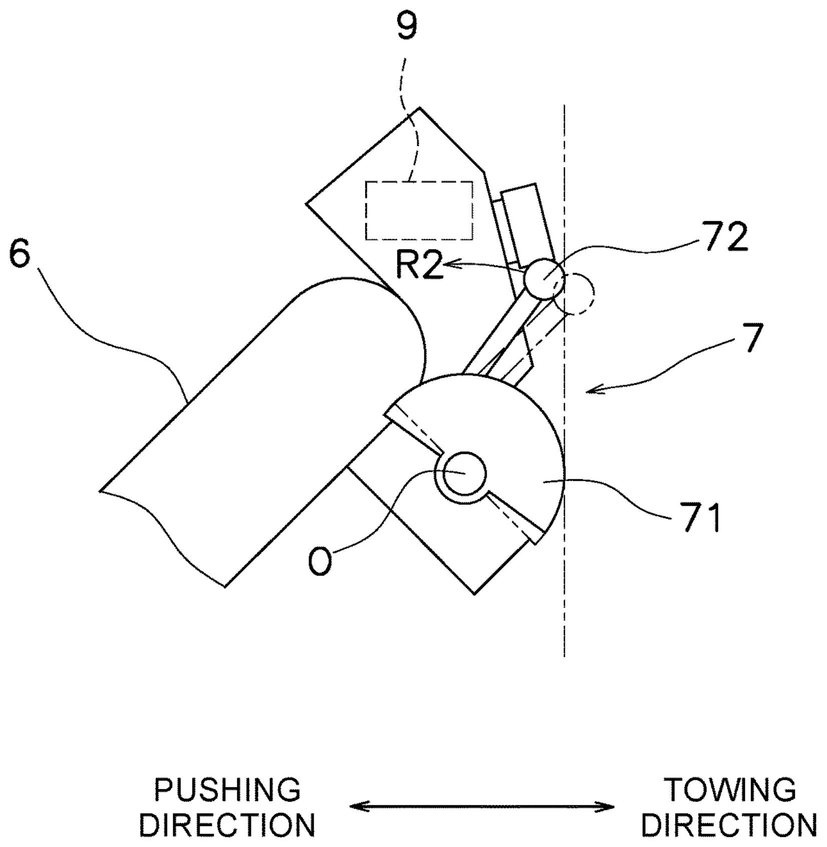
FIG. 5 is a closeup view showing the action of the operating part.

When the pallet truck 200 then further travels in the towing direction, with the operating part 7 being in contact with the user, the operating part 7 pivots to the counter-clockwise side R2 about the pivot axis O as shown in FIG. 5. In other words, the operating part 7 is operated in the pushing direction. In accordance with the action of the operating part 7, the control part 9 controls the electric motor 2 such that the pallet truck 200 travels in the pushing direction. Because of this, the direction of travel of the pallet truck 200 is changed, i.e., from the towing direction to the pushing direction, and the pallet truck 200 travels in the pushing direction. In other words, the pallet truck 200 is moved in a direction away from the user. When the pallet truck 200 is moved to separate from the user, the operating part 7 is pivoted to return to the neutral position. Then, when the pallet truck 200 is moved in the pushing direction as it is, the operating part 7 returns to the neutral position as shown in FIG. 2, whereby the control part 9 controls the electric motor 2 such that the pallet truck 200 stops traveling. In other words, the control part 9 stops driving of the electric motor 2. Based on the above, it is made possible to prevent the user from being sandwiched between the pallet truck 200 and an object of some kind.

[Modifications]

One preferred embodiment of the claimed invention has been explained above. However, the claimed invention is not limited to the above, and a variety of changes can be made without departing from the scope of the claimed invention. It should be noted that the various modifications to be described can be utilized simultaneously.

(a) In the presently preferred embodiment described above, the operating part 7 includes the base portion 71 and the operating lever 72; however, the operating part 7 is not limited in configuration to this. For example, the operating part 7 may not include the base portion 71. In that case, the operating lever 72 would be pivotably attached to the attachment part 70. Alternatively, the operating lever 72 may be directly attached to the handle part 6.

Figure 6:
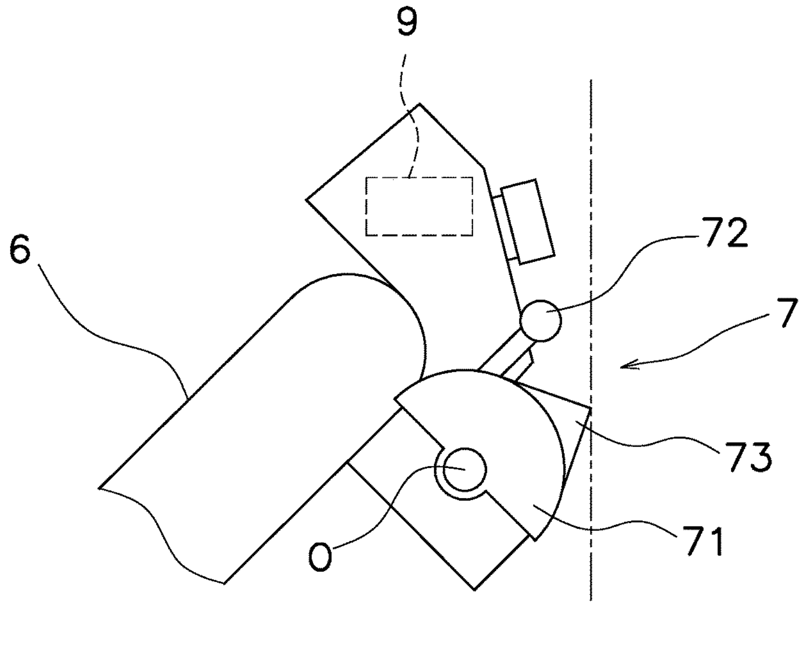
FIG. 6 is a closeup view of an operating part and the surroundings thereof according to a modification.

(b) As shown in FIG. 6, the operating part 7 may further include a contact portion 73 in addition to the base portion 71 and the operating lever 72. The contact portion 73 is configured to be unitarily operated with the base portion 71. In other words, when the contact portion 73 is pivoted, both the base portion 71 and the operating lever 72 are pivoted as well. The contact portion 73 is located on the distal end in the towing direction. In other words, in the presently preferred embodiment described above, amongst the constituent portions of the operating part 7, the operating lever 72 contacts the user; however, in the present modification, not the operating lever 72 but the contact portion 73 contacts the user.

(c) In the preferred embodiment described above, the pivot axis O of the operating part 7 extends in the horizontal direction; alternatively, the pivot axis O of the operating part 7 may extend in the vertical direction or any other direction.

(d) In the preferred embodiment described above, the operating part 7 is pivoted to be operated in the towing direction and the pushing direction; however, the operating part 7 is not limited in configuration to this. For example, when pulled by the user, the operating part 7 may be configured to be operated in the towing direction; on the other hand, when pushed by the user, the operating part 7 may be configured to be operated in the pushing direction.

LIST OF REFERENCE NUMERALS

2: Electric motor, 4: Support part, 5: Operating mast, 6: Handle part, 7: Operating part, 71: Base portion, 72: Operating lever, 73: Contact portion, 8: Emergency stop switch, 9: Control part, 100: Drive unit, 200: Pallet truck, 201: Loading platform

We claim the following:

1. A drive unit configured to make a mobile object travel in a towing direction in which the mobile object is towed and a pushing direction in which the mobile object is pushed, the drive unit comprising:

an electric motor;

an operating part configured to be operated in the towing direction and the pushing direction, the operating part located on a distal end in the towing direction;

a control part configured to control the electric motor such that the mobile object travels in the towing direction when it has been determined that the operating part has been operated in the towing direction, the control part configured to control the electric motor such that the mobile object travels in the pushing direction when it has been determined that the operating part has been operated in the pushing direction;

a support part;

an operating mast extending upward from the support part; and a handle part disposed on an upper end of the operating mast, wherein the operating part is attached to the handle part, and the operating part includes a base portion attached to the handle part, an operating lever extending from the base portion, the operating lever configured to be unitarily operated with the base portion, and a contact portion configured to be unitarily operated with the base portion, the contact portion located on the distal end in the towing direction, and the operating lever is unitarily pivoted with the base portion such that both the operating lever and the base portion pivot when the contact portion is pivoted.

2. The drive unit according to claim 1, further comprising:

an emergency stop switch disposed on the handle part, wherein the control part is configured to stop the electric motor when the emergency stop switch has been operated by a user.

3. The drive unit according to claim 1, wherein the operating part includes an operating lever, the operating lever extending from the handle part, the operating lever located on the distal end in the towing direction.

4. A pallet truck comprising:

a loading platform; and the drive unit recited in claim 1, wherein the support part is attached to the loading platform.

5. The drive unit according to claim 1, wherein the operating part includes a base portion, and an operating lever extending from the base portion, the operating lever configured to be unitarily operated with the base portion, the operating lever is unitarily pivoted with the base portion.

* * * * *